United States Patent
Pedersen

(10) Patent No.: US 11,136,962 B2
(45) Date of Patent: Oct. 5, 2021

(54) WIND TURBINE AND A METHOD OF OPERATING A WIND TURBINE FOR REDUCING EDGEWISE VIBRATIONS

(71) Applicant: Envision Energy (Denmark) ApS, Silkeborg (DK)

(72) Inventor: Keld Stefan Pedersen, Vejle (DK)

(73) Assignee: Envision Energy (Denmark) ApS, Silkeborg (DK)

(*) Notice: Subject to any disclaimer, the term of this patent is extended or adjusted under 35 U.S.C. 154(b) by 440 days.

(21) Appl. No.: 15/781,167

(22) PCT Filed: Dec. 2, 2016

(86) PCT No.: PCT/DK2016/050411
§ 371 (c)(1),
(2) Date: Jun. 4, 2018

(87) PCT Pub. No.: WO2017/092773
PCT Pub. Date: Jun. 8, 2017

(65) Prior Publication Data
US 2020/0263666 A1   Aug. 20, 2020

(30) Foreign Application Priority Data
Dec. 4, 2015 (DK) .......................... PA 2015 70802

(51) Int. Cl.
*F03D 7/04* (2006.01)
*F03D 7/02* (2006.01)
*F03D 17/00* (2016.01)

(52) U.S. Cl.
CPC .......... *F03D 7/042* (2013.01); *F03D 7/0224* (2013.01); *F03D 7/0296* (2013.01); *F03D 17/00* (2016.05);
(Continued)

(58) Field of Classification Search
CPC ...... F03D 7/042; F03D 7/0224; F03D 7/0296; F03D 17/00; F05B 2260/96;
(Continued)

(56) References Cited

U.S. PATENT DOCUMENTS

2004/0108729 A1   6/2004   Wobben
2007/0110578 A1   5/2007   Stommel
(Continued)

FOREIGN PATENT DOCUMENTS

EP   1643122 A2   4/2006
EP   2179337 A1   4/2010
(Continued)

OTHER PUBLICATIONS

Petersen et al., "Local Blade Whirl and Global Rotor Whirl Interaction", Risø National Laboratory, Roskilde, Denmark, Aug. 1998.

*Primary Examiner* — Darrin D Dunn
*Assistant Examiner* — Christopher W Carter
(74) *Attorney, Agent, or Firm* — James Creighton Wray

(57) ABSTRACT

The present invention relates to a wind turbine and a method of operating a wind turbine for reducing edgewise vibrations, wherein the wind turbine comprises a wind turbine control system having at least one vibration sensor for measuring the edgewise vibrations and a controller for receiving the vibration signal from the vibration sensor. The sensor unit is preferably an accelerometer arranged in a stationary frame of reference. The controller determines at least one whirling mode frequency and the vibration level thereof. The controller initiates a corrective action if the measured vibration level exceeds a threshold value. The corrective action is preferably an adjustment of the pitch angle of the wind turbine blades which in turn dampens the edgewise vibrations.

11 Claims, 3 Drawing Sheets

(52) U.S. Cl.
CPC ....... *F05B 2260/96* (2013.01); *F05B 2270/32* (2013.01); *F05B 2270/327* (2013.01); *F05B 2270/328* (2013.01); *F05B 2270/329* (2013.01); *F05B 2270/334* (2013.01); *F05B 2270/335* (2013.01)

(58) Field of Classification Search
CPC .......... F05B 2270/327; F05B 2270/328; F05B 2270/329; F05B 2270/334; F05B 2270/335
USPC ........................................................ 700/291
See application file for complete search history.

(56) References Cited

U.S. PATENT DOCUMENTS

| | | | |
|---|---|---|---|
| 2009/0246020 A1* | 10/2009 | Nielsen | F03D 7/024 |
| | | | 416/1 |
| 2010/0187820 A1* | 7/2010 | Wakasa | F03D 7/0296 |
| | | | 290/44 |
| 2012/0257967 A1 | 10/2012 | Egedal | |

FOREIGN PATENT DOCUMENTS

| | | |
|---|---|---|
| EP | 2420806 A1 | 2/2012 |
| EP | 2469083 A2 | 6/2012 |

* cited by examiner

WIND TURBINE AND A METHOD OF OPERATING A WIND TURBINE FOR REDUCING EDGEWISE VIBRATIONS

FIELD OF THE INVENTION

The present invention relates to a method of controlling a wind turbine for reducing the edgewise vibrations, wherein a vibration signal indicative of the edgewise vibrations is measured in the wind turbine, a vibration level of at least a whirling mode is determined based on this vibration signal, the vibration level is compared to a threshold value, and the operation of the wind turbine is regulated if the vibration level exceeds the threshold value.

The present invention also relates to a system of controlling a wind turbine for reducing the edgewise vibrations, wherein an accelerometer arranged in the wind turbine is configured to measure a vibration signal indicative of the edgewise vibrations, and a controller is configured to determine a vibration level of at least a whirling mode based on the vibration signal, wherein the controller is further configured to compare the vibration level to a threshold value and to regulate the operation of the wind turbine if the vibration level exceeds the threshold value.

BACKGROUND OF THE INVENTION

It is known to place sensor units, such as accelerometers, inside wind turbine blades for measuring various conditions, e.g. the vibration level, of the wind turbine blades. However, these sensor units are likely to fail due to fatigue loads, static electricity or lightning strikes. The sensor units are also subjected to a hard environment with large temperature changes and are also likely to get hit by loose objects, e.g. clumps of glue, being thrown around inside the wind turbine blade as it rotates. Replacing and servicing such sensor units represent a time-consuming and expensive process which increases the downtime of the wind turbine. Such sensor units also add steps to the manufacturing process and increase the total installation costs which are multiple with the number of wind turbine blades.

It is known to place accelerometers on the gearbox unit, the generator unit or the main bearings for monitoring the vibration levels of these components. The vibration signals from these sensors are normally used by a controller in the wind turbine system to reduce excessive vibrations and fatigue loads in these components by regulating the control parameters used to operate the wind turbine.

The article "Local blade whirl and global rotor whirl interaction" by Joergen Thirstrup Petersen et al., Risoe, August 1998, discloses a relative simple mathematical model for determining the whirling mode vibrations of a wind turbine with three wind turbine blades. It is stated that a relationship exists between the local whirling mode vibrations of the wind turbine blades and the global whirling mode vibrations of the rotor. The simulated examples suggest that the frequencies of the global whirling modes are a function of the rotational speed of the rotor and that the vibration level increases due to resonance if the global whirling mode coincides with the passing frequency of the wind turbine blades and the frequency of the rotational speed. This article is silent about how this mathematical model can be implemented in a control scheme of the wind turbine.

Moreover, finding a working implementation has hereto proven challenging,

Patent publication US 2012/0257967 discloses a method and a controller for generating a pitch angle control signal and, in particular, for controlling an edgewise rotor vibration. The pitch angle control signal is generated such that it varies in accordance with a rotor blade vibration motion. According to the disclosure, vibration is measured in the nacelle. Furthermore, the disclosure requires a rather complicated processing scheme.

Thus, there is a need for an improved control method for regulating the operation of the wind turbine for reducing the edgewise vibrations of the wind turbine blades that does not use accelerometers placed in the wind turbine blades.

OBJECT OF THE INVENTION

An object of the invention is to provide a control method that monitors the vibrations caused by at least one of the whirling modes of the wind turbine.

An object of the invention is to provide a control method that reduces the whirling mode vibration level.

An object of the invention is to provide a control method that can be implemented in existing wind turbine control systems.

An object of the invention is to provide a wind turbine control system capable of monitoring the vibrations caused by at least one of the whirling modes of the wind turbine.

An object of the invention is to provide a wind turbine control system capable of reducing the whirling mode vibration level.

An object of the invention is to provide a method and a workable system that can detect edgewise vibrations and to provide actions to mitigate such vibrations. It is also an object to provide an alternative, and particularly a simple and/or flexible alternative prior art teachings, to obtain sufficiently good vibrations signals having a frequency spectrum where peaks indicative of one or more frequencies of undesirable modes can be identified using simple workable analytics.

DESCRIPTION OF THE INVENTION

An object is achieved by method of controlling a wind turbine for reducing edgewise vibrations, the method comprising acts of regulating a wind turbine as a function of a level and frequency of edgewise vibrations, wherein the edgewise vibration level and frequency are determined as a function of one or two vibration signals obtained from the wind turbine.

This provides a method that is particularly simple and sufficiently robust since the method requires only a few, such as a single or two, vibration signals to be measured and processed. One vibration signal may provide sufficient information about a vibration mode. If the vibration signal is obtained from the nacelle, only a single vibration signal has shown to be sufficient.

The method provides greater flexibility in the location of measuring the vibration signal. The method further provides greater flexibility in the choice of type of vibration signal.

In an aspect, the vibration signal may be obtained from a single vibration signal measured in a nacelle of the wind turbine. In an aspect, the vibration signal may be two vibration signals measured on the tower of the wind turbine. In an aspect, the vibration signal may be a single vibration signal measured on the tower of the wind turbine.

If the vibration signal is obtained from the tower, two vibration signals, preferably placed in a 90-degrees angle, but in principle in any positive angle, about the yaw-axis, provide sufficient information at all yaw-positions of the nacelle. In principle, a single vibration signal from the tower may be sufficient. In that case there may be temporal periods with poor signals.

In an aspect, a single vibration signal may be obtained from the tower and provided by the vibration sensor being moved according to the position of the rotor (about the yaw-axis).

Moreover, measuring vibration signals only on the tower can be performed with greater flexibility and the tower structure has surprisingly shown to provide sufficiently good signals to identify edgewise vibrations in the frequency spectrum.

Furthermore, the tower allows for a variety of vibration sensors to be placed in a variety of locations on the tower to provide sufficiently good signals that are easy or easier to interpret in the frequency domain. In the frequency spectrum of such signals peaks indicative of edgewise motions have shown to be identifiable; even using simple peak detection methods.

In an aspect, the vibration signal is obtained from the top-part of the tower. The top part may be at least the upper half of the tower or the upper quarter of the tower. The top part may be within a distance from the nacelle, such distance may be within the length of the nacelle.

In an aspect, the frequency of the edgewise vibration is determined from the frequency spectrum of the vibration signal by identifying the frequency location of a pair of peaks in the frequency spectrum.

Such pair of frequencies allows for the frequency of a mode of the edgewise vibration to be determined as the centre frequency of the two peaks i.e. the $f_{edge}=(f_{peak\ 1}+f_{peak\ 2})/2$ In an aspect, the frequency of edgewise vibration is determined from the frequency spectrum of the vibration signal by identifying at least one peak in a predetermined frequency band or frequency range.

The actual frequency of the edgewise vibration may be determined from such a peak, even a single peak, by adding or subtracting a predetermined frequency to the frequency of the peak.

The frequency band may be known empirically or determined during the design of the wind turbine or provided by the blade manufacturer.

The change or growth of a peak may also be used to identify the frequency of edgewise vibration.

In an aspect, the frequency of edgewise vibration is determined by identifying the frequency location of multiple pairs of peaks or at least one peak in multiple predetermined frequency bands in the frequency spectrum.

Hence, more modes may be identified and corrective actions may be performed accordingly.

In an aspect, the vibration signal is obtained as a measure side-to-side acceleration of the tower and determined by two sensors placed 90-degrees apart on the yaw-axis and directly on the tower in the top part of the tower.

Such a side-to-side acceleration measurement, i.e. in perpendicular directions, has shown to provide simple, reliable and sufficient signals to determine edgewise vibration modes.

In an aspect, the vibration signal is obtained as a measure of tower displacement or tower strain.

Tower displacement is understood as general mechanical vibrations or movements of a point on the tower.

Movements or dynamics may be detected by a variety of methods and may be performed from or to a fixed point, for example by use of laser light.

Strain gauges may also be used to measure tower vibrations that can be used for analysis.

In an aspect, the level of vibration is determined from the height, amplitude or power of one or more identified peaks.

The method is also insensitive to absolute measures and for particular vibration signals and their origin, the method allows for simple measures of the level of edgewise vibrations by installing the method and then determine a height or amplitude of a peak in the frequency spectrum, or the power spectrum.

In an aspect, the act of regulating the operation of the wind turbine comprises one or more acts of:
adjusting a pitch angle of the at least one wind turbine blade,
adjusting the rotational speed of the rotor of the wind turbine,
adjusting a yaw angle of a nacelle of the wind turbine,
adjusting a generator torque signal or a power output signal of the wind turbine, and
applying a braking force to the at least one wind turbine blade using a braking system of the wind turbine.

The act of regulating, which may be an act of corrective action, may be performed by one or more of the above actions. The act may be performed as a corrective action to dampen or eliminate an edgewise vibration (mode), which will die. The act may be temporally or for a period of time before resuming to the otherwise intended setting.

In an aspect, the pitch angle of the at least one wind turbine blade is pitched if at least one vibration level exceeds the at least one threshold value.

An object may be achieved by a wind turbine comprising a wind turbine tower, a nacelle arranged on top of the wind turbine tower, a rotatable rotor with at least one wind turbine blade arranged relative to the nacelle, and a wind turbine control system, wherein the wind turbine control system comprises at least one vibration sensor configured to measure two vibration signals of the tower dynamics and a controller connected to the two vibration sensors, wherein the controller is configured to determine at least one frequency of an edgewise vibration and the level based on the two vibration signals, and wherein the controller is further configured to compare the vibration level of the at least one edgewise vibration of the at least one determined frequency to at least one threshold value and to regulate the operation of the wind turbine if the vibration level exceeds the at least one threshold value.

In an aspect, the two vibration sensor's unit are arranged on the wind turbine tower in an angle about the yaw-axis.

In an aspect, the two vibration sensor's unit are arranged on the top part of the tower.

In an aspect, the at least one vibration sensor is configured to measure the at least one vibration signal along at least a lateral direction perpendicular to a central rotational axis of the rotor.

In an aspect, the wind turbine control system is connected to at least one component selected from a pitch mechanism configured to pitch the at least one wind turbine into a pitch angle, a yaw mechanism configured to yaw the nacelle into a yaw angle, a generator configured to generate a power output signal, a power convertor configured to generate another power output signal, and a braking system configured to apply a braking force to the rotor, wherein the controller is configured to regulate the operation of the wind turbine by adjusting at least one control parameter of the at least one component so that the edgewise vibrations are reduced.

In an aspect, the controller is configured to execute computer implemented instructions that perform one or more acts described.

Hereinafter are disclosed background and substantially identical aspects based on the same inventive concepts. Furthermore, explanatory details and options for implementations are disclosed.

An object of the invention is achieved by a method of controlling a wind turbine for reducing edgewise vibrations, the method comprises the steps of:
measuring at least one vibration signal indicative of edgewise vibrations in the wind turbine,
determining a vibration level based on the at least one vibration signal, wherein the vibration level is compared to at least one threshold value,
regulating the operation of the wind turbine if the vibration level exceeds the at least one threshold value, characterised in that the method further comprises the step of:
determining at least one whirling mode frequency of at least one whirling mode of the wind turbine, and wherein the vibration level of the at least one whirling mode is determined using the at least one whirling mode frequency.

The term "edgewise vibrations" is defined as vibrations or deflective movements along an edgewise direction defined by the chord of the wind turbine blades, where the chord extends from the trailing edge to the leading edge of the wind turbine blades.

This provides a control method that is able to monitor and control the whirling mode vibration level of the wind turbine. This also provides a control scheme that is able to regulate the operation of the wind turbine in order to reduce the whirling mode vibrations. The present control method is suitable for wind turbines having any number of wind turbine blades, such as two or three wind turbine blades. The present control method reduces the risk of large operational loads on the wind turbine blades as the edgewise vibrations are reduced to a minimum. The present control method can be implemented into existing wind turbine control systems or into the wind turbine control systems of new wind turbines.

According to one embodiment, the at least one whirling mode frequency is determined as function of a rotational speed of a rotor of the wind turbine.

The frequency of the whirling mode, i.e. the whirling mode frequency, may be approximated as a function of the frequency of the blade edgewise vibrations and the rotational speed:

$$f_{whirl} = f_{edge} \pm f_{rotor}$$

Wherein $f_{whirl}$ is the whirling mode frequency, $f_{edge}$ is the blade edgewise frequency, and $f_{rotor}$ is the rotational frequency of the rotor.

The rotational speed may be measured using a rotational speed sensor, e.g. an encoder or an inductive sensor, arranged relative to the rotor. The wind turbine may be outfitted with a rotational speed sensor which is positioned relative to the rotor, e.g. the rotor shaft, during installation. This enables the whirling mode frequency to be determined directly based on the rotational speed which in turn allows for an accurate calculation of this whirling mode frequency.

The rotational speed may also be an existing rotational speed sensor located in or on the wind turbine. The present wind turbine control system, e.g. the controller, is then electrically connected to this existing rotational speed sensor or to an existing controller in order to receive a speed signal indicative of the rotational speed of the rotor. The present controller may be electronically connected to the existing controller or implemented into the existing controller. This reduces the installation costs as the controller can be adapted to communicate with any existing wind turbine systems.

According to one embodiment, the at least one vibration signal is measured along a lateral direction perpendicular to a central rotational axis of the rotor of the wind turbine.

The controller may alternatively determine the whirling mode frequency using the vibration signal of one or more vibration sensors. The vibration sensor may be positioned relative to a component of the wind turbine so that it is able to directly or indirectly measure the whirling mode vibrations, e.g. the edgewise vibrations, of the wind turbine blades. In example, the component may be a wind turbine blade, a rotor shaft, a gearbox unit, a generator unit, a bearing unit, or another suitable component. This vibration sensor may also be used to determine the vibration level of the whirling mode. The whirling mode vibrations are preferably measured using one or more accelerometers, but other types of vibration sensor may be used. This also allows the installation costs to be reduced as the existing accelerometers located in the wind turbine may be used to determine the whirling mode frequency.

The vibration sensor, e.g. the accelerometer, used to determine the vibration level and/or the whirling mode frequency may be arranged to measure the vibrations in a stationary frame of reference located at or near the top of the wind turbine. The frame of reference may be defined by the nacelle, or the upper part of the wind turbine tower. Alternatively, the vibrations may be measured in a rotating frame of reference, e.g. defined by the wind turbine blades, the rotor hub, or the rotor shaft, and then transferred to the stationary frame of reference. The vibration signal may be measured along at least a lateral direction perpendicular to a central rotational axis of the rotor shaft as the side-to-side vibrations/accelerations of the wind turbine are indicative of the movements caused by the whirling mode.

According to a special embodiment, a frequency transformation function is applied to the at least one vibration signal, wherein the vibration level is determined based on this frequency transformed signal.

The measured vibration signal may be transferred into the frequency domain, e.g. from the time domain, using any type of a frequency transformation function. In example, the frequency transformation algorithm may be a Fourier transfer algorithm, e.g. a fast-Fourier transformation, a maximum entropy algorithm, or another suitable frequency transformation algorithm. The controller may then analyse this frequency transformed signal in order to determine the whirling mode frequency and optionally the vibration level of the whirling mode. This allows the controller to perform a spectral analysis of the measured vibration signal for determining the whirling mode frequency and optionally the vibration level. Other techniques may be used to determine the whirling mode frequency and/or the vibration level.

Alternatively, a filter function may be applied to the measured vibration signal, wherein this filtered signal is analysed to determine the vibration level of the whirling mode. In example, the filter function may be a discrete filter function. This allows the controller to determine the vibration level in the time domain.

According to one embodiment, the method further comprises the step of:
determining at least one first whirling mode frequency and at least one second whirling mode frequency of the at least one whirling mode frequency, wherein the at least one first and second whirling mode frequencies are indicative of the at least one whirling mode.

A first whirling mode frequency and a second whirling mode frequency may be determined by the controller in relation to the rotational direction of the rotor in the rotor plane. In example, the rotational direction may be a clockwise direction or an anti-clockwise direction. The first whirling mode frequency may be indicative of a whirling mode movement that occurs in an opposite direction compared to the rotational direction. The second whirling mode frequency may be indicative of a whirling mode movement that occurs in the same direction as the rotational direction. The trailing edge and/or the leading edge of the respective wind turbine blade may move in a substantially elliptically pattern during the whirling mode, wherein this elliptically movement has either a progressive or retrograde effect on the forces acting on the stationary frame of reference, e.g. the nacelle. The rotational frequency, e.g. the 1P frequency, of the rotor may be used to calculate the frequency range of the whirling mode, i.e. the whirling mode range. This allows the controller to also monitor the whirling mode range during rotation of the rotor, e.g. in normal power production mode or in another operating mode.

According to one embodiment, the method further comprises the step of:
monitoring a third whirling mode frequency of a first whirling mode and at least a fourth whirling mode frequency of at least a second whirling mode of the at least one whirling mode, wherein the at least fourth whirling mode frequency is greater than the third whirling mode frequency.

The controller may use the measured rotational speed or the vibration signal, e.g. the frequency transformed signal, to determine one or more whirling modes of the wind turbine. The whirling modes may be determined within a predetermined operating range of the wind turbine, e.g. the operating range of the rotational speed of the rotor. The controller may determine at least one whirling mode frequency, e.g. the third whirling mode frequency, of a first whirling mode and at least one whirling mode frequency, e.g. the fourth whirling mode frequency, of a second whirling mode. Optionally, the controller may further determine at least one whirling mode frequency of at least a third whirling mode, and so forth. In example, the controller may determine a first and a second whirling mode frequency for each of these whirling modes. The operating frequency of the rotor may be used to calculate the whirling mode range associated with each of these whirling modes. This allows the controller to monitor any whirling modes occurring in the operating range of the rotor. The individual whirling mode may be monitored individually and in parallel.

The amplitudes of first and second whirling mode frequencies may be used to determine a vibration level for each respective whirling mode. The vibration level may then be compared to an averaged threshold value in order to determine if the operation of the wind turbine needs to be regulated or not. Alternatively, an individual vibration level may be determined for each of the first and second whirling mode frequencies. The individual vibration levels may then be compared to individual threshold values in order to determine if the operation of the wind turbine needs to be regulated or not. The controller may regulate the operation of the wind turbine if at least one of the individual vibration levels or the averaged vibration level exceeds their respective threshold value. This allows for a better monitoring of the vibration level of each respective whirling mode and in turn a better regulating of the operation of the wind turbine.

The first and second whirling mode frequencies may be monitored and compared to their respective threshold values independently or simultaneously.

One or more of the whirling modes may also be compared to one or more critical frequencies, e.g. the eigenfrequency of a selected component of the wind turbine. In example, the critical frequency may be an eigenfrequency of a drive train of the wind turbine, a passing frequency of the wind turbine blades (e.g. a 3P frequency), or another suitable critical frequency. The passing frequency may be determined as any multiples of the number of wind turbine blades and the rotational speed. The controller may compare the whirling mode frequency, e.g. the first or second whirling mode frequency, to the critical frequencies in order to detect if the two frequencies are coinciding or close to coincide. This may cause an increase in the measured vibration level which in turn may trigger the regulation process described below if the respective threshold value is exceeded. These critical frequencies may also be used to determine the threshold value(s) for the vibration level(s) of each whirling mode.

According to one embodiment, the step of regulating the operation of the wind turbine comprises at least one of:
adjusting a pitch angle of the at least one wind turbine blade,
adjusting the rotational speed of the rotor of the wind turbine,
adjusting a yaw angle of a nacelle of the wind turbine,
adjusting a generator torque signal or a power output signal of the wind turbine, and
applying a braking force to the at least one wind turbine blade using a braking system of the wind turbine.

If the vibration level exceeds the respective threshold value, the controller may adjust the value of one or more control parameters used to control the operation of the wind turbine. The control parameter may in example be a control value or a control set point for either pitching the wind turbine blades, rotating the rotor, yawing the nacelle, controlling the generator torque of the generator, controlling the power output or the generator or power convertor, or another suitable control parameter. The controller may also regulate the operation of the wind turbine by adjusting a control parameter of a braking system of the wind turbine, e.g. transmitting an activation signal, which in turn slows down the rotation of the rotor. The above-mentioned corrective actions may be combined in order to provide a better regulating of the operation of the wind turbine.

According to another special embodiment, the pitch angle of the at least one wind turbine blade is adjusted by no more than 5 degrees relative to a normal pitch angle if the vibration level exceeds the at least one threshold value.

The controller preferably adjusts the respective set points for pitching the wind turbine blades relative to a normal set point. The normal set point may be defined as a set point for achieving a maximal power production or maintaining a nominal power output. In example, the normal set point, e.g. the pitch angle, may be adjusted by no more than 5 degrees, preferably between 2 and 4 degrees or any values there in between. This pitching action and subsequent change in the rotational speed have a significant damping effect of the whirling mode vibrations.

According to one embodiment, the at least one threshold value is determined based on one or more simulations and/or one or more measurements.

The threshold value, e.g. the averaged threshold value or the individual threshold values, may be determined by performing one or more simulations, wherein the simulation results are then analysed and evaluated in order to determine the suitable threshold values. The critical frequencies of the components of the wind turbines may also be taken into account when determining the threshold values. Alternatively, the respective threshold values may be determined based on previous measurements, e.g. from the wind turbine or from other wind turbines. The simulations and/or previous measurement may also be used to determine the critical frequencies of the wind turbines and/or the whirling frequency.

The controller may be configured to perform the above-mentioned control process at regular time intervals or when it is deemed necessary, e.g. by continuously monitoring the whirling mode vibration level. The controller may also be configured to update the critical frequencies of the wind turbines and/or the whirling frequency based on at least the current measurement, e.g. after each run of the above-mentioned control process.

An object of the invention is achieved by a wind turbine comprising a wind turbine tower, a nacelle arranged on top of the wind turbine tower, a rotatable rotor with at least one wind turbine blade arranged relative to the nacelle, and a wind turbine control system, wherein the wind turbine control system comprises at least one vibration sensor configured to measure at least one vibration signal indicative of edgewise vibrations in the wind turbine and a controller connected to the at least one vibration sensor, wherein the controller is configured to determine a vibration level based on the at least one vibration signal, wherein the controller is further configured to compare the vibration level to at least one threshold value and to regulate the operation of the wind turbine if the vibration level exceeds the at least one threshold value, characterised in that the controller is configured to determine at least one whirling frequency of at least one whirling mode of the wind turbine, wherein the vibration level is determined by using the at least one whirling mode frequency.

This provides a wind turbine control system capable of regulating the operation of the wind turbine in the event that the whirling mode vibrations exceed an acceptable level. The wind turbine control system is also able to monitor and control the vibration level of the whirling modes during rotation of the rotor. The wind turbine may have any number of wind turbine blades, such as two or three wind turbine blades. This reduces the risk of large loads on the wind turbine blades as the edgewise vibrations are reduced to a minimum.

According to one embodiment, the at least one vibration sensor unit is arranged relative to the top of the wind turbine tower, wherein the at least one vibration sensor is configured to measure the at least one vibration signal along at least a lateral direction perpendicular to a central rotational axis of the rotor.

One or more vibration sensors are arranged on or in the wind turbine so that they are able to directly or indirectly measure the whirling mode vibrations occurring in the wind turbine blades. The vibration sensors may be arranged relative to a stationary frame of reference as described earlier. The vibration sensor is configured to measure the sideward vibrations in the lateral direction and, optionally, the forward and backward vibrations in the axial direction (defined by the central rotational axis of the rotor shaft). The vibration sensor may be any type of vibration sensor, such as an accelerometer, a displacement sensor, a strain gauge, a speed sensor, or another vibration sensor. This eliminates the need for arranging the sensors inside the wind turbine blades. This also reduces the risk of a sensor failure as the vibration sensor and its appendages are placed in a less dynamic environment.

The vibration sensor may advantageously be an existing vibration sensor located in the wind turbine which is capable of direct or indirectly measuring the whirling mode vibrations. Preferably, the vibration sensor is an accelerometer. The controller may be configured to communicate with this vibration sensor, e.g. via an existing wind turbine control system. Alternatively, the controller may be implemented into the existing wind turbine system. This reduces the installation costs and allows the controller to be adapted to any existing wind turbine control systems.

According to one embodiment, the controller is configured to monitor a third whirling mode frequency of a first whirling mode and at least a fourth whirling mode frequency of at least a second whirling mode of the at least one whirling mode within an operating range defined by a rotational speed of the rotor.

The controller may be configured to monitor the vibration level of any whirling modes within the operating range of the wind turbine. The operating range may be defined as the operating range of the rotational speed of the rotor, e.g. extending from a minimum rotation speed to a maximum rotation speed. This operating range may correspond to a frequency band in the frequency domain which extends from a minimum frequency value to a maximum frequency value. This frequency band may then be applied to the frequency transformed signal in the controller. The controller may be configured to detect any whirling modes located within that frequency band. The controller may be configured to further determine the first and second whirling mode frequencies and the whirling mode range for each of the whirling modes as described earlier. This allows the controller to also monitor the whirling mode range during rotation of the rotor and determine when a corrective action is required.

The controller may be electrically connected to one or more rotational speed sensors arranged relative to the rotor, e.g. on the rotor shaft, or relative to the passing wind turbine blades for receiving a rotational speed signal indicative of the rotational speed of the rotor. The rotational speed sensor may be any type of rotational speed sensor, such as an encoder or an inductive sensor. The rotational speed sensor may advantageously be an existing rotational speed sensor located inside or outside on the wind turbine. The controller may be connected to the rotational speed sensor and/or the vibration sensor via a wired or wireless connection. This further reduces the installation costs.

According to one embodiment, the wind turbine control system is connected to at least one component selected from a pitch mechanism configured to pitch the at least one wind turbine into a pitch angle, a yaw mechanism configured to yaw the nacelle into a yaw angle, a generator configured to generate a power output signal, a power converter to generate another power output signal, and a braking system configured to apply a braking force to the rotor, wherein the controller is configured to regulate the operation of the wind turbine by adjusting at least one control parameter of the at least one component so that the edgewise vibrations are reduced.

The controller may be configured to initiate one or more corrective actions when the vibration level exceeds the respective threshold value. The controller may be configured to directly communicate with the respective components of the wind turbine, or via an existing wind turbine control system. The controller may be configured to adjust the control value or control set point of one or more control parameters relative to their normal value or set point. The normal value or set point may be defined by the control value or control set point for producing a maximum power output or maintaining a nominal power output. This adjusted control parameter may then be transmitted to the respective component which in turn adjusts its operation accordingly. The pitch mechanism, the yaw mechanism, the generator, the power convertor and/or the braking system may be used to regulate the operation of the wind turbine so that the edgewise vibrations of the wind turbine blades are reduced to a minimum.

According to a special embodiment, the controller is configured to adjust the pitch angle of the at least one wind turbine blade so that the at least one wind turbine blade is pitched out of the wind.

The pitch mechanism is preferably used to dampen the edgewise vibrations as the pitching action has a significant aerodynamic dampening effect on the whirling mode vibrations in the wind turbine blades. The pitching action may result in a subsequent change in the rotational speed which in turn also provides a good dampening effect on the edgewise vibrations. The controller may be configured to adjust the control parameter for pitching the respective wind turbine blades relative to their normal control parameter as described earlier. This provides a fast and very effective dampening of the edgewise vibrations.

The invention is not limited to the embodiments described herein, and thus the described embodiments can be combined in any manner without deviating from the objections of the invention.

In a 1st aspect of the invention, there is a method of controlling a wind turbine for reducing edgewise vibrations, the method comprises the steps of:
  measuring at least one vibration signal indicative of edgewise vibrations in the wind turbine,
  determining a vibration level based on the at least one vibration signal, wherein the vibration level is compared to at least one threshold value,
  regulating the operation of the wind turbine if the vibration level exceeds the at least one threshold value,
  characterised in that the method further comprises the step of:
  determining at least one whirling mode frequency of at least one whirling mode of the wind turbine, and wherein the vibration level of the at least one whirling mode is determined using the at least one whirling mode frequency.

In a $2^{nd}$ aspect, there is a method according to the $1^{st}$ aspect, characterised in that the at least one whirling mode frequency is determined as function of a rotational speed of a rotor of the wind turbine.

In a $3^{rd}$ aspect, there is a method according to the $1^{st}$ or $2^{nd}$ aspect, characterised in that the at least one vibration signal is measured along a lateral direction perpendicular to a central rotational axis of the rotor of the wind turbine.

In a $4^{th}$ aspect there is a method according to the $3^{rd}$ aspect, characterised in that a frequency transformation function is applied to the at least one vibration signal, wherein the vibration level is determined based on this frequency transformed signal.

In a $5^{th}$ aspect there is a method according to any one of aspect 1 to 4, characterised in that the method further comprises the step of:
  determining at least one first whirling mode frequency and at least one second whirling mode frequency of the at least one whirling mode frequency, wherein the at least one first and second whirling mode frequencies are indicative of the at least one whirling mode.

In a $6^{th}$ aspect there is a method according to any one of aspects 1 to 5, characterised in that the method further comprises the step of:
  monitoring a third whirling mode frequency of a first whirling mode and at least a fourth whirling mode frequency of at least a second whirling mode of the at least one whirling mode, wherein the at least fourth whirling mode frequency is greater than the third whirling mode frequency.

In a $7^{th}$ aspect there is a method according to any one of aspects 1 to 6, characterised in that the step of regulating the operation of the wind turbine comprises at least one of:
  adjusting a pitch angle of the at least one wind turbine blade,
  adjusting the rotational speed of the rotor of the wind turbine,
  adjusting a yaw angle of a nacelle of the wind turbine,
  adjusting a generator torque signal or a power output signal of the wind turbine, and
  applying a braking force to the at least one wind turbine blade using a braking system of the wind turbine.

In an $8^{th}$ aspect there is a method according to aspect 7, characterised in that the pitch angle of the at least one wind turbine blade is pitched out of the wind if the vibration level exceeds the at least one threshold value.

In a $9^{th}$ aspect there is a method according to any one of aspect 1 to 8, characterised in that the at least one threshold value is determined based on one or more simulations and/or one or more measurements.

In a $10^{th}$ aspect there is a wind turbine comprising a wind turbine tower, a nacelle arranged on top of the wind turbine tower, a rotatable rotor with at least one wind turbine blade arranged relative to the nacelle, and a wind turbine control system, wherein the wind turbine control system comprises at least one vibration sensor configured to measure at least one vibration signal indicative of edgewise vibrations in the wind turbine and a controller connected to the at least one vibration sensor, wherein the controller is configured to determine a vibration level based on the at least one vibration signal, wherein the controller is further configured to compare the vibration level to at least one threshold value and to regulate the operation of the wind turbine if the vibration level exceeds the at least one threshold value characterised in, that the controller is configured to determine at least one whirling frequency of at least one whirling mode of the wind turbine, wherein the vibration level is determined using the at least one whirling mode frequency.

In an $11^{th}$ aspect there is a wind turbine according to aspect 10, characterised in that the at least one vibration sensor unit is arranged relative to the top of the wind turbine tower, wherein the at least one vibration sensor is configured to measure the at least one vibration signal along at least a lateral direction perpendicular to a central rotational axis of the rotor.

In a $12^{th}$ aspect there is a wind turbine according to aspect 10 or 11, characterised in that the controller is configured to monitor a third whirling mode frequency of a first whirling mode and at least a fourth whirling mode frequency of at least a second whirling mode of the at least one whirling mode within an operating range defined by a rotational speed of the rotor.

In a $13^{th}$ aspect there is a wind turbine according to any one of aspect 10 to 12, characterised in that the wind turbine control system is connected to at least one component selected from a pitch mechanism configured to pitch the at least one wind turbine into a pitch angle, a yaw mechanism configured to yaw the nacelle into a yaw angle, a generator configured to generate a power output signal, a power convertor configured to generate another power output signal, and a braking system configured to apply a braking force to the rotor, wherein the controller is configured to regulate the operation of the wind turbine by adjusting at least one control parameter of the at least one component so that the edgewise vibrations are reduced.

In a 14$^{th}$ aspect there is a method according to aspect 13, characterised in that the controller is configured to adjust the pitch angle of the at least one wind turbine blade so that the at least one wind turbine blade is pitched out of the wind.

DESCRIPTION OF THE DRAWING

The invention is described by example only and with reference to the drawings, wherein.

Figure 1:
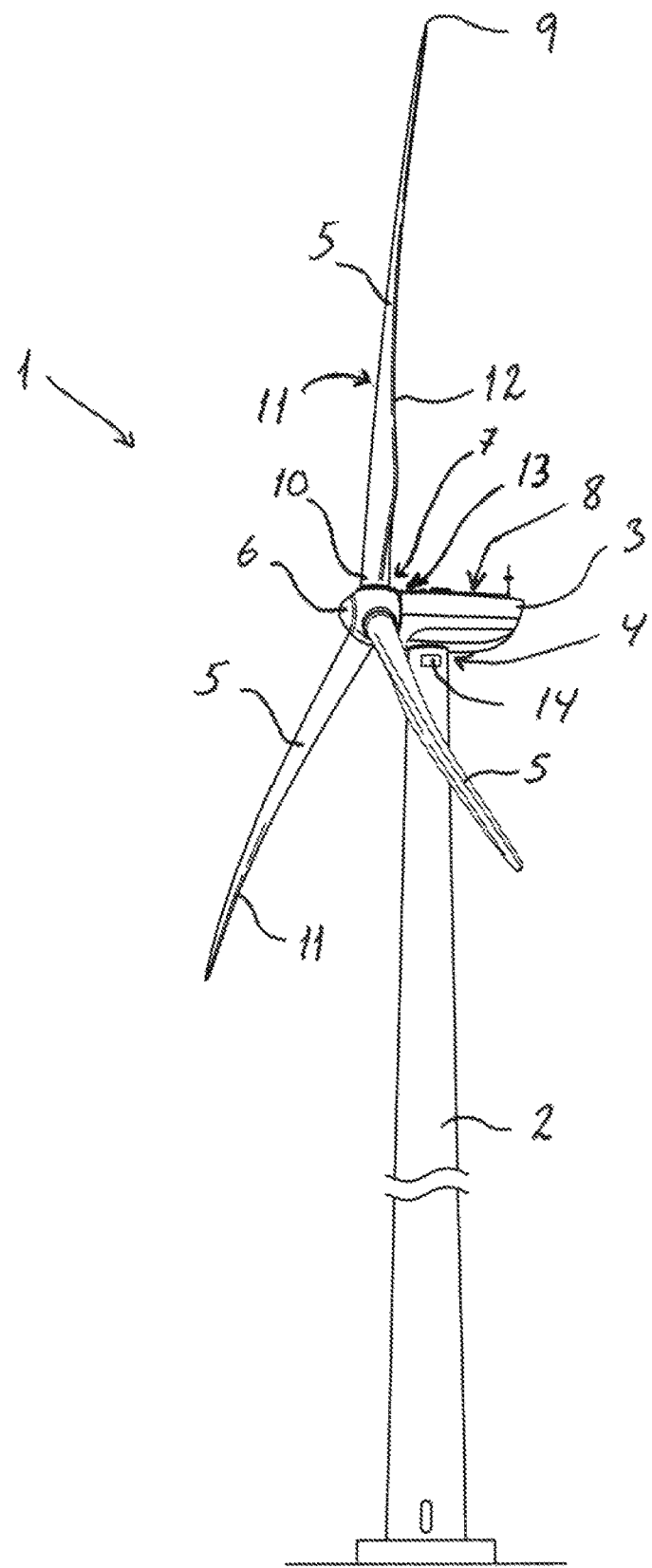
FIG. 1 shows an exemplary embodiment of a wind turbine.

In the following text, the figures will be described one by one, and the different parts and positions seen in the figures will be numbered with the same numbers in the different figures. Not all parts and positions indicated in a specific figure will necessarily be discussed together with that figure.

REFERENCE LIST

1. Wind turbine
2. Wind turbine tower
3. Nacelle
4. Yaw mechanism
5. Wind turbine blades
6. Rotor hub
7. Pitch mechanism
8. Generator
9. Tip end
10. Blade root
11. Leading edge
12. Trailing edge
13. Braking system
14. Vibration sensor
15. Vibration signal measured in the wind turbine blade
16. First whirling mode
17. Second whirling mode
18. Vibration signal measured in the wind turbine tower
19. First transfer function
20. Second transfer function
21. Vibration level
22. Pitch angle offset

DETAILED DESCRIPTION OF THE INVENTION

FIG. 1 shows a wind turbine 1 comprising a wind turbine tower 2 and a nacelle 3 arranged on top of the wind turbine tower 2 using a yaw mechanism 4. The yaw mechanism 4 is configured to yaw the nacelle 3 into a yaw angle. A rotor comprising at least two wind turbine blades 5 mounted to a rotor hub 6 via a pitch mechanism 7.

The pitch mechanism 7 is configured to pitch the wind turbine blades 5 into a pitch angle. The rotor hub 6 is rotatably connected to a generator 8 arranged in the wind turbine 1 via a rotor shaft.

Each wind turbine blade 5 comprises a tip end 9 and a blade root 10, wherein the wind turbine blade 5 has an aerodynamic profile defining a leading edge 11 and a trailing edge 12. A braking system 13 is arranged relative to the rotor and is configured to apply a braking force to the rotor. At least one vibration sensor 14 is arranged on the wind turbine 1 for measuring a vibration signal of the wind turbine 1. The vibration sensor 14 forms part of a wind turbine control system wherein a controller is connected to the vibration sensor 14.

Figure 2:
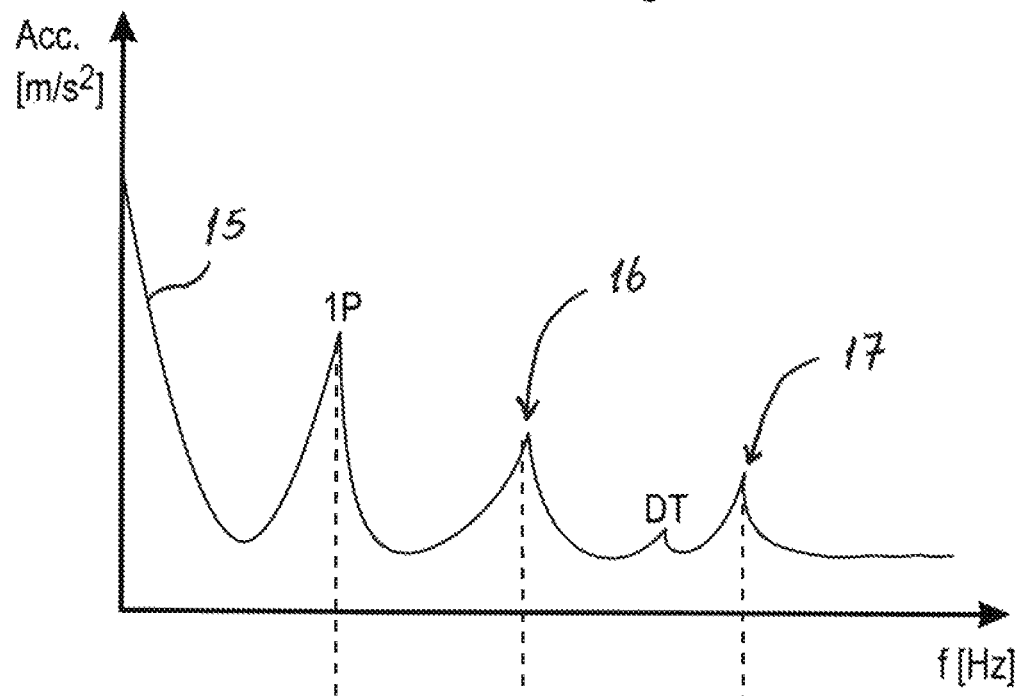
FIG. 2 shows an exemplary graph of a vibration signal measured in a rotating frame of reference.

FIG. 2 shows an exemplary graph of a vibration signal 15 measured in a rotating frame of reference, wherein the vibration signal 15 is measured in the wind turbine blade 5. The vibration signal 15 is here shown as an acceleration signal indicative of the edgewise vibrations in the wind turbine blades 5.

The rotational speed of the rotor may be determined by analysing the vibration signal 15, wherein the peak marked "1P" indicates the rotational frequency of the rotor. The vibration signal 15 further includes a plurality of individual edgewise modes indicative of the edgewise vibrations. Here, only a first edgewise mode 16 and a second edgewise mode 17 are shown. The vibration signal 15 may be analysed to determine a blade edgewise frequency of the first edgewise mode 16 and a blade edgewise frequency of the second edgewise mode 17. The individual edgewise modes 16, 17 are monitored and analysed individually and in parallel.

Figure 3:
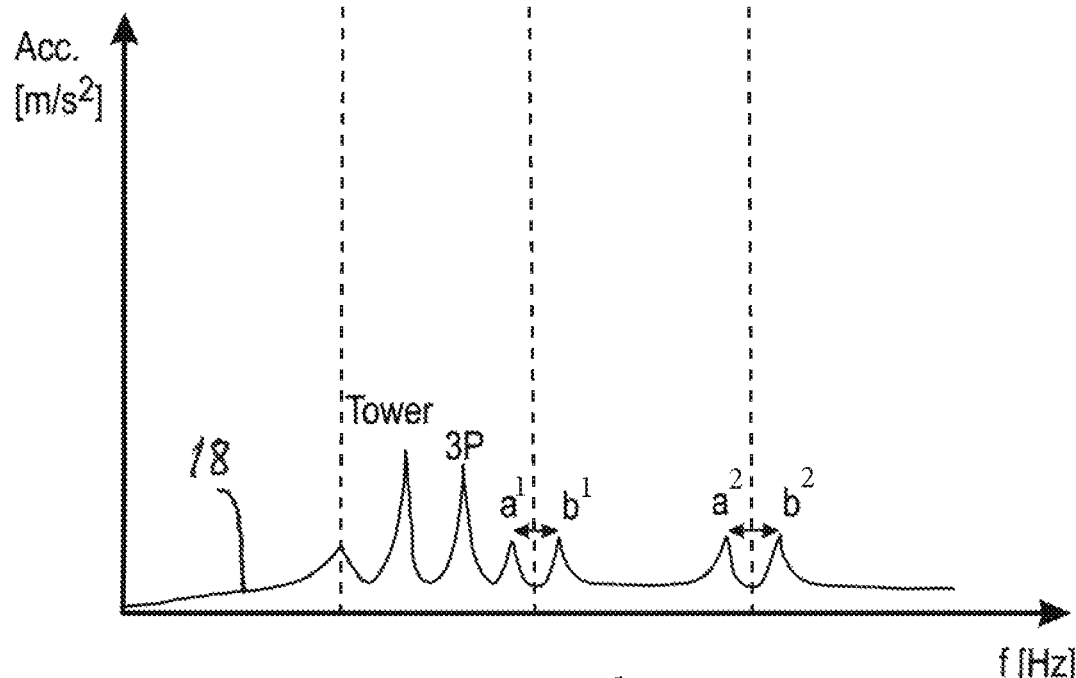
FIG. 3 shows an exemplary graph of a vibration signal measured in a stationary frame of reference.

FIG. 3 shows an exemplary graph of another vibration signal 18 measured in a stationary frame of reference, wherein the edgewise vibrations in the wind turbine blades 5 are indirectly determined by measuring a vibration signal using a vibration sensor located in the wind turbine tower 2 or the nacelle 3. The vibration signal 18 is measured in a lateral direction perpendicular to the rotation axis of the rotor.

The vibration signal 18 is analysed to determine a first whirling mode frequency, a, and a second whirling mode frequency, b, of each of the edgewise modes 16, 17. The first whirling mode frequency is indicative of a backward whirling mode movement that occurs in an opposite direction compared to the rotational direction. The second whirling mode frequency is indicative of a forward whirling mode movement that occurs in the same direction compared to the rotational direction. The rotational frequency, 1P, is used to determine a whirling mode range for each whirling mode 16, 17.

The frequency spectrum of the vibration signal 18 obtained from vibration measurements of the tower 2 or the nacelle 3 shows a first pair of peaks $a^1$ and $b^1$ corresponding to a first edgewise vibration mode 16 seen in FIG. 2. The peak a1 is located at $f_{edge}$-1P, where 1P is the rotation frequency, and is the "backward whirling mode". The peak $b^1$ is located at $f_{edge}$+1P and is the "forward whirling mode".

The frequency of the first edgewise vibration mode 16 may then be determined as $f_{edge}=(f_{peak\_a}+f_{peak\_b})/2$.

Likewise, the second pair of peaks $a^2$ and $b^2$ corresponds to a second edgewise vibration mode 17 seen in FIG. 2.

Identifying one or both of peaks a and b in the frequency spectrum from a vibration simply obtained from vibration measurements in the tower or in the nacelle will allow for determining the corresponding edgewise vibration mode.

One peak, a or b, may also be determined by looking in a band or frequency range in the spectrum. The band or frequency may be 1P, 2P or in that order. A peak identified in such a band may indicate the frequency of a corresponding edgewise mode.

The vibration signal 18 is transformed into the frequency domain using a frequency transformation function. The frequency transformed signal is analysed and at least the vibration levels of the first and second whirling mode frequencies are determined.

As indicated in FIGS. 2 and 3, the vibration signal 15, 18 includes a number of critical frequencies, e.g. the eigenfrequencies of the wind turbine tower marked "Tower", of the drivetrain of the wind turbine 1 marked "DT", and of the passing frequency of the wind turbine blades marked "3P". The individual critical frequencies may be taken into account when determining the vibration level of the respective edgewise modes 16, 17.

Figure 4:
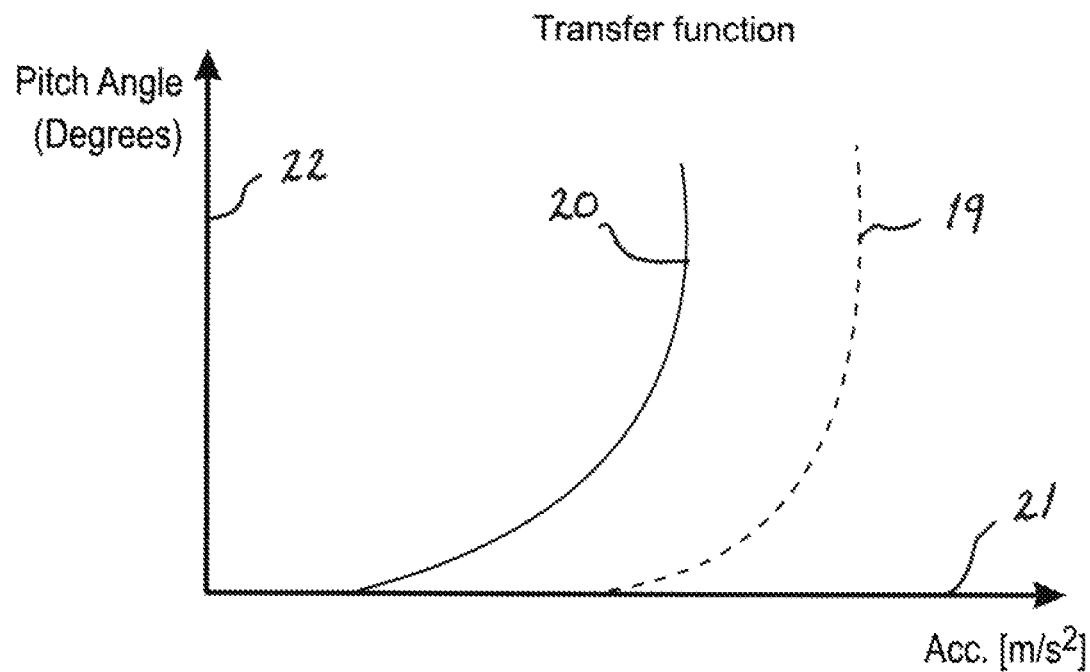
FIG. 4 shows an exemplary graph of two transfer functions as function of the vibration level.

FIG. 4 shows an exemplary graph of two transfer functions 19, 20 used to determine a corrective action. A first transfer function 19 is applied to the vibration level 21 of the first edgewise mode 16 and a second transfer function 20 is applied to the vibration level 21 of the second edgewise mode 17.

In this embodiment, the transfer functions 19, 20 are used to determine a pitch angle offset 22 for adjustment of the pitch angle of the wind turbine blades 5. The pitch angle offset 22 is optionally compared to a predetermined threshold value. If the pitch angle offset 22 exceeds this threshold value, then the controller initiates a shutdown procedure and the wind turbine 1 is shut down until the vibration level 21 drops below the respective threshold value. The pitch angle offset is used by the pitch mechanism to pitch the wind turbine blades 5 out of the wind relative to a normal pitch angle. The pitching of the wind turbine blades 5 has significant dampening effect of the whirling mode vibrations in the wind turbine blades 5.

Figure 5:
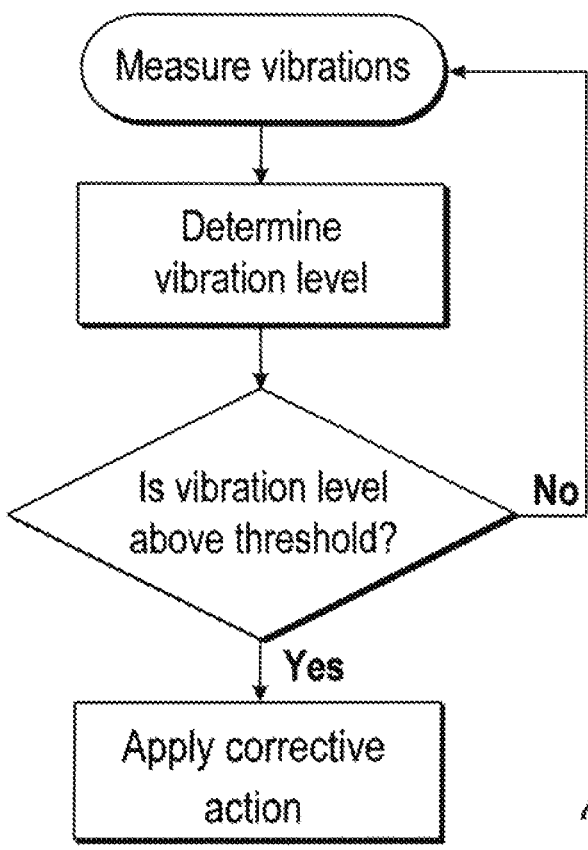
FIG. 5 shows an exemplary flowchart of the control method according to the invention.

FIG. 5 shows an exemplary flowchart of the control method according to the invention. The controller of the wind turbine control system monitors the whirling modes within the operating range of the rotational speed of the rotor. The vibration signal 15, 18 is measured using the vibration sensor 14 and transferred to the controller.

The controller analyses the vibration signal, e.g. in the frequency domain, to determine the first and second whirling mode frequencies of the individual whirling modes 16, 17. The controller further determines the individual vibration levels 21 using the whirling mode frequencies.

The respective vibration levels 21 are then compared to individual threshold values in the controller. If the vibration levels 21 are below the threshold values, then the controller continues to monitor the whirling mode vibrations. If at least one of the vibration levels 21 exceeds its respective threshold value, then the controller determines a suitable corrective action, e.g. a pitch angle offset. Suitable control parameters are then transmitted to the respective component, e.g. the pitch mechanism, which in turn adjusts its operation accordingly.

The invention claimed is:

1. A method of controlling a wind turbine for reducing edgewise vibrations of blades, the method comprising:
regulating a wind turbine as a function of a vibration level and frequency of edgewise vibrations,
wherein the edgewise vibration level and frequency are determined as a function of a vibration signal of the wind turbine side-to-side vibrations of the tower obtained from the wind turbine,
wherein the side-to-side vibrations of the tower are obtained from a single vibration signal obtained in a nacelle of the wind turbine,
wherein the frequency of edgewise vibration is determined from the frequency spectrum of the vibration signal by identifying the frequency location of a pair of peaks in the frequency spectrum,
wherein the wind turbine is whirling in a rotational direction wherein the vibration signal is analyzed to determine a first whirling mode frequency and a second whirling mode frequency,
wherein the first whirling mode frequency is indicative of backward whirling mode movement that occurs in an opposite direction compared to the rotational direction,
wherein the second whirling mode frequency is indicative of forward whirling mode movement that occurs in the rotational direction,
wherein an edgewise vibration mode frequency is determined from one-half of a sum of the first whirling mode frequency and the second whirling mode frequency,
and when the edgewise vibration mode frequency exceeds a predetermined threshold, regulating operation of the wind turbine components.

2. The method according to claim 1, wherein the frequency of edgewise vibration is determined from the frequency spectrum of the vibration signal by identifying at least one peak in a predetermined frequency band.

3. The method according to claim 2, wherein the frequency of edgewise vibration is determined by identifying the frequency location of multiple pairs of peaks or at least one peak in a predetermined frequency band in the frequency spectrum.

4. The method according to claim 2, wherein the level of vibration is determined from the height or power of one or more identified peaks.

5. The method according to claim 1, wherein the act of regulating the operation of the wind turbine comprises one or more acts of:
adjusting a pitch angle of the at least one wind turbine blade,
adjusting the rotational speed of the rotor of the wind turbine,
adjusting a yaw angle of the nacelle of the wind turbine,
adjusting a generator torque signal or a power output signal of the wind turbine, and
applying a braking force to the at least one wind turbine blade using a braking system of the wind turbine.

6. The method according to claim 5, wherein the one or more acts of adjusting or applying is performed as a transfer function of the vibration level.

7. The method according to claim 6, wherein the pitch angle of the at least one wind turbine blade is pitched if the edgewise vibration mode frequency exceeds the predetermined threshold.

8. A wind turbine having a controller, wherein the controller is configured to execute computer implemented instructions that perform the method as described in claim 1.

9. A wind turbine comprising:
a wind turbine tower,
a nacelle arranged on top of the wind turbine tower,
a rotatable rotor with at least one wind turbine blade arranged relative to the nacelle,
and a wind turbine control system,
wherein the wind turbine control system comprises a single vibration sensor configured to measure one vibration signal along at least a lateral direction perpendicular to a central rotational axis of the rotor, and a controller connected to receive the vibration signal,
wherein the controller is configured to determine at least one frequency of an edgewise vibration based on the vibration signal,
wherein the wind turbine is whirling in a rotational direction wherein the vibration signal is analyzed to determine a first whirling mode frequency and a second whirling mode frequency,
wherein the first whirling mode frequency is indicative of backward whirling mode movement that occurs in an opposite direction compared to the rotational direction,
wherein the second whirling mode frequency is indicative of forward whirling mode movement that occurs in the rotational direction,
wherein an edgewise vibration mode frequency is determined from one-half of a sum of the first whirling mode frequency and the second whirling mode frequency,
and when the edgewise vibration mode frequency exceeds a predetermined threshold, regulate operation of the wind turbine components.

10. The wind turbine according to claim 9, wherein the wind turbine control system is connected to at least one component selected from a pitch mechanism configured to pitch the at least one wind turbine into a pitch angle, a yaw mechanism configured to yaw the nacelle into a yaw angle, a generator configured to generate a power output signal, a power convertor configured to generate another power output signal, and a braking system configured to apply a braking force to the rotor, wherein the controller is configured to regulate the operation of the wind turbine by adjusting at least one control parameter of the at least one component so that the edgewise vibrations are reduced.

11. The wind turbine according to claim 9, wherein the wind turbine control system is configured to determine the frequency of edgewise vibration determined from a frequency spectrum of the vibration signal by identifying a frequency location pairs of backward and forward peaks in the frequency spectrum.

* * * * *